United States Patent
Nishioka et al.

(10) Patent No.: US 6,871,078 B2
(45) Date of Patent: Mar. 22, 2005

(54) WIRELESS COMMUNICATION DEVICE CAPABLE OF CONTROLLING TRANSMISSION POWER AND TRANSMISSION POWER CONTROL METHOD THEREFOR AND WIRELESS COMMUNICATION SYSTEM EMPLOYING THE SAME

(75) Inventors: Ryousuke Nishioka, Tenri (JP); Hidetomo Ohnishi, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 612 days.

(21) Appl. No.: 09/771,551

(22) Filed: Jan. 30, 2001

(65) Prior Publication Data

US 2001/0011023 A1 Aug. 2, 2001

(30) Foreign Application Priority Data

Jan. 31, 2000 (JP) ...................................... 2000-022450

(51) Int. Cl.⁷ ................................................ H04Q 7/20
(52) U.S. Cl. .......................... 455/522; 455/69; 370/318
(58) Field of Search ............................... 455/522, 13.4, 455/68, 69; 370/318, 319, 317, 320, 321

(56) References Cited

U.S. PATENT DOCUMENTS 5,590,409 A * 12/1996 Sawahashi et al. ........... 455/69
5,924,015 A * 7/1999 Garrison et al. ........... 455/13.4
6,163,707 A * 12/2000 Miller ......................... 455/522
6,351,651 B1 * 2/2002 Hamabe et al. ............. 455/522
6,606,313 B1 * 8/2003 Dahlman et al. ........... 370/347

FOREIGN PATENT DOCUMENTS

JP  9-93198   4/1997
JP  10-13338  1/1998

* cited by examiner

Primary Examiner—Nay Maung
Assistant Examiner—Tanmay Lele
(74) Attorney, Agent, or Firm—Birch, Stewart, Kolasch & Birch, LLP

(57) ABSTRACT

The present invention provides a method of controlling transmission power including the steps of: increasing transmission power immediately after a data transmission without waiting for a response signal to be received indicating a result of receiving the transmitted data; if the response signal received reveals that the transmitted data has been unsuccessfully received, retransmitting the same data and also holding transmission power applied when the data is retransmitted; if the response signal received reveals that the transmitted data has been successfully received and data previously transmitted has also been successfully received, reducing transmission power for a subsequent data transmission by a predetermined amount; and if the response signal received reveals that the data transmitted has been successfully received and data previously transmitted has been unsuccessfully received, setting transmission power for the subsequent data transmission depending on the transmission power held being applied when the data was retransmitted.

21 Claims, 12 Drawing Sheets

WIRELESS COMMUNICATION DEVICE CAPABLE OF CONTROLLING TRANSMISSION POWER AND TRANSMISSION POWER CONTROL METHOD THEREFOR AND WIRELESS COMMUNICATION SYSTEM EMPLOYING THE SAME

BACKGROUND OF THE INVENTION

1. Field of the Invention

The present invention relates generally to wireless communication devices, transmission power control methods therefor and wireless communication systems provided with the wireless communication devices and particularly to wireless communication devices capable of saving otherwise wastefully used transmission power to increase the longevity of a power source having a limited period for use, such as represented by batteries, transmission power control methods therefor and wireless communication systems provided with the wireless communication devices.

2. Description of the Background Art

Typically, wireless communication performs transmission with a fixed level of transmission power. In a wireless communication device, however, a battery or a similar power source having a limited period for use is used to supply power required for circuit operation and that for transmitting an electronic wave by wireless. As such, increasing the longevity of the power source is an important issue. To address this issue, various techniques have been proposed to refer for example to a distance for communication, a condition for communication and the like to control transmission power to save transmission power otherwise wastefully used.

One such technique is disclosed in Japanese Patent Laying-Open No. 9-93198. In this technique, a communication error rate is calculated for a predetermined period or amount of transmission or reception. If an obtained error rate is larger than a predetermined value, an infrared ray to be transmitted is increased in intensity to provide more reliable transmission. If an obtained error rate is smaller than the predetermined value, an infrared ray to be transmitted is decreased in intensity to reduce power consumption.

Another such technique is disclosed in Japanese Patent Laying-Open No. 10-13338. In this technique, a wireless communication device having transmitted data returns a response signal corresponding to an ACK signal (for normal reception) or an NACK signal (for abnormal reception) and when the ACK signal is received successively a predetermined number of times the current transmission power is decreased by a predetermined amount and whenever the NACK signal is received the current transmission power is increased by a predetermined amount to set the transmission power of the wireless communication device to be equal to a minimal level of transmission power receivable by a counterpart wireless communication device to minimize power consumption and thus extend a limited longevity of a power source.

The technique as disclosed in Japanese Patent Laying-Open No. 9-93198, however, requires calculating a communication error rate. As such, an infrared ray cannot have its intensity appropriately controlled for the predetermined period or amount of communication transmitted during the calculation of the communication error rate. As such, power is wasted for this predetermined amount of delay.

In the technique as disclosed in Japanese Patent Laying-Open No. 10-13338, a response signal is initially received and the determination of the ACK signal/NACK signal is then provided before transmission power is controlled. As such, if an NACK signal indicative of a reception failure is received from a counterpart wireless communication device and a retransmission of the same data is required, a period of time is required for a processing to increase transmission power before the data is retransmitted. This period of time is not negligible in rapidly transmitting data, disadvantageously resulting in a slow response.

SUMMARY OF THE INVENTION

The present invention contemplates a wireless communication device capable of controlling a level of transmission power in response to a response signal received from a counterpart communication device to save power otherwise wastefully consumed and also allow rapid communication, a method of controlling transmission power of the wireless communication device, and a wireless communication system including such a wireless communication device as a component.

The present invention provides a wireless communication device including a control portion, a transmitter and a response signal determination portion. The control portion sets data to be transmitted and a level of transmission power to be used to transmit the data to be transmitted. The transmitter transmits the data with the level of transmission power set by the control portion. The response signal determination portion receives an external signal and determines therefrom whether the data has been transmitted successfully or unsuccessfully. After the data has been completely transmitted and before whether the data has been successfully or unsuccessfully transmitted is determined, the control portion increases the level of transmission power for the current data transmission by a first predetermined level to a first level of power to set a level of transmission power for a subsequent data transmission, and if the response signal determination portion determines that the current data has been successfully transmitted then the control portion sets the level of transmission power for the subsequent data transmission to be a second level of power corresponding to the first level of power minus a second predetermined level.

Preferably, if the response signal determination portion determines that the current data has been unsuccessfully transmitted then the control portion sets as data to be subsequently transmitted the same data as that unsuccessfully transmitted and the transmitter uses the first level of power to retransmit the same data.

Thus the present wireless communication device can increase a level of transmission power for a subsequent data transmission regardless of the result of the current data transmission and if the current data has been successfully transmitted then the wireless communication device can decrease the once increased level of transmission power to control transmission power in level for data transmission in rapid response to the result of the current data transmission.

Since a level of transmission power is previously increased and then if data has been unsuccessfully transmitted then the same data is retransmitted, the data having been unsuccessfully transmitted can be retransmitted rapidly.

The present invention in another aspect provides a method of controlling transmission power of the wireless communication device including the steps of:

performing a data transmission with a level of transmission power; after the data transmission has completed, increasing the level of transmission power of the data transmission by a first predetermined level to provide a level of transmission power for a subsequent data transmission; referring to an externally received signal to determine whether the data transmission is successful or unsuccessful; and if the data transmission is successful; and decreasing by a second predetermined level the level of transmission power for the subsequent data transmission corresponding to the level of transmission power for the data transmission plus the first predetermined level.

Preferably the second predetermined level is greater than the first predetermined level.

Thus in the present method a level of transmission power can be increased for a subsequent data transmission regardless of the result of the current data transmission and if the current data transmission has been found successful then the level of transmission power once increased can be decreased to control transmission power in level for data transmission in rapid response to the result of the current data transmission.

Furthermore, when the current data transmission is found successful, transmission power can be decreased in level by an amount greater than when transmission power is increased in level regardless of the result of the current data transmission. As such, for successful data transmission a level of transmission power can be gradually decreased. As a result, power consumption can be effectively reduced.

The present invention in still another aspect provides a wireless communication system including a receiving, first wireless communication device and a transmitting, second wireless communication device. The first wireless communication device returns a response signal indicating a result of receiving transmitted data. The second wireless communication device can control a level of transmission power for data transmission. The second wireless communication device includes a control portion for setting data to be transmitted subjected to data transmission and a level of transmission power for the data transmission, a transmitter for performing the data transmission with the level of transmission power set by the control portion and a response signal determination portion determining from a response signal whether the data transmission has been successful or unsuccessful. After the data transmission has completed and before whether the data transmission has been successful or unsuccessful is determined, the control portion increases a level of transmission power of the current data transmission by a first predetermined level to a first level of power, and if the response signal determination portion determines that the current data transmission has been successful then the control portion reduces the level of transmission power for the subsequent data transmission corresponding to the first level of power by a second predetermined level to a second level of power. The second predetermined level is smaller than the first predetermined level.

Thus the present wireless communication system can transmit data via a wireless communication device capable of increasing a level of transmission power for a subsequent data transmission regardless of the result of the current transmission and decreasing the once increased level of transmission power if the current data transmission is found successful. As such, data can be transmitted with a level of transmission power controlled in rapid response to the result of the current data transmission.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Initially, reference will be made of FIGS. 1 and 2 to describe a communication sequence and transmission power level control in a wireless communication system 10 according to an embodiment of the present invention. Wireless communication system 10 includes a communication device A serving as a transmitting wireless communication device and a communication device B serving as a receiving wireless communication device.

In wireless communication system 10, communication device A transmits data to communication device B and communication device B returns to communication device A a response signal indicating whether the data transmitted has been normally received. The response signal includes a signal ACK issued when data transmitted has been normally received (or when a data transmission is successful) and a signal NACK issued when data transmitted has not been normally received (or when a data transmission fails).

When data is not successfully transmitted and communication device A has thus received signal NACK, communication device A retransmits the same data. Communication device A also responds to a response signal to control a level of power to be used to transmit data.

Figure 1:
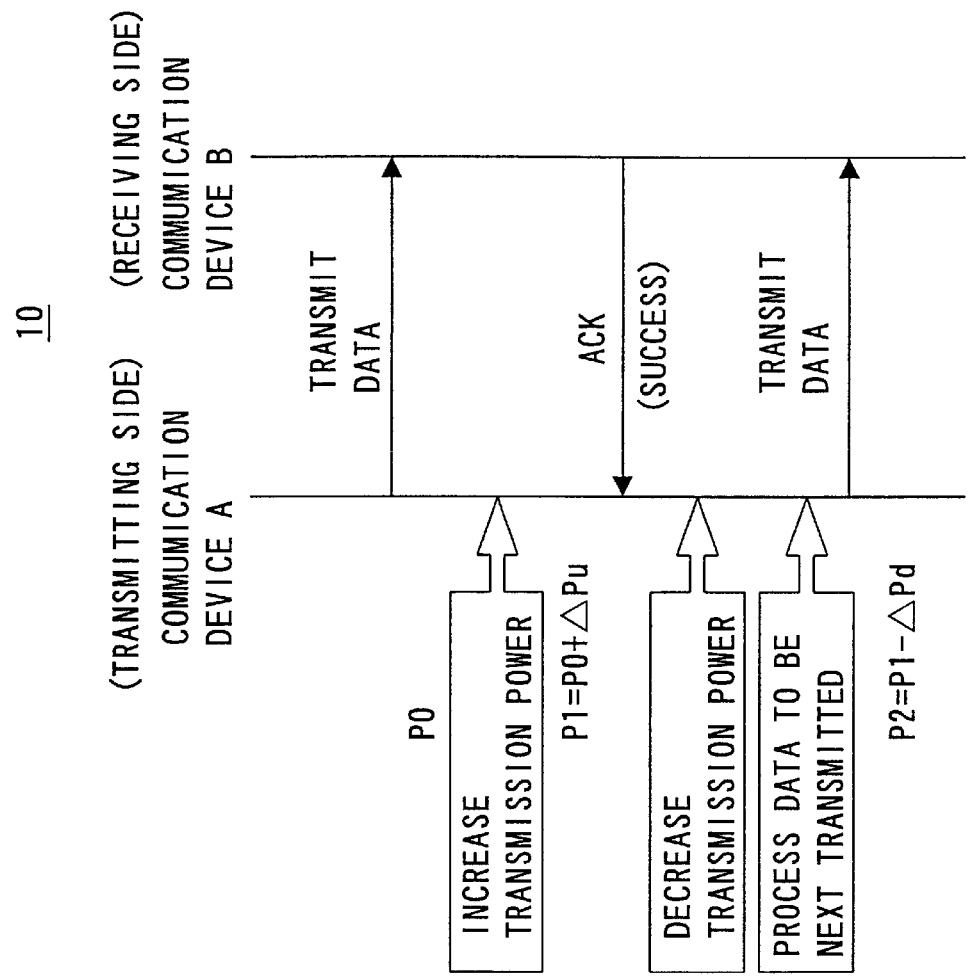
FIG. 1 is a first diagram for illustrating a communication sequence and transmission power level control in a wireless communication system 10 according to an embodiment of the present invention.

FIG. 1 shows a sequence applied to control transmission power in level when data has been successfully transmitted.

Initially, transmitting communication device A transmits data to receiving communication device B with a level of transmission power P0. Then, without waiting a response signal to be received, communication device A immediately increases the level of transmission power P0 to a level of transmission power P1, which is equal to P0+ΔPu. When communication device B has normally received data transmitted from communication device A, communication device B returns to communication device A signal ACK indicative of a successful reception of data.

Communication device A receives signal ACK and thus recognizes that a communication has normally completed and communication device A controls the level of transmission power P1 to drop it to a level of transmission power P2, which is equal to P1−ΔPd. Then, data to be subsequently transmitted is processed and when the data to be transmitted is thus prepared communication device A transmits the data with the level of power P2. It should be noted that data to be subsequently transmitted may be processed in parallel with a level of transmission power. In this case, the subsequent data transmission can be performed earlier.

Herein if a step value ΔPu increasing a level of transmission power is larger than a step value ΔPd decreasing a level of transmission power or ΔPd>ΔPu then transmission power decreases in level whenever transmission normally completes.

Figure 2:
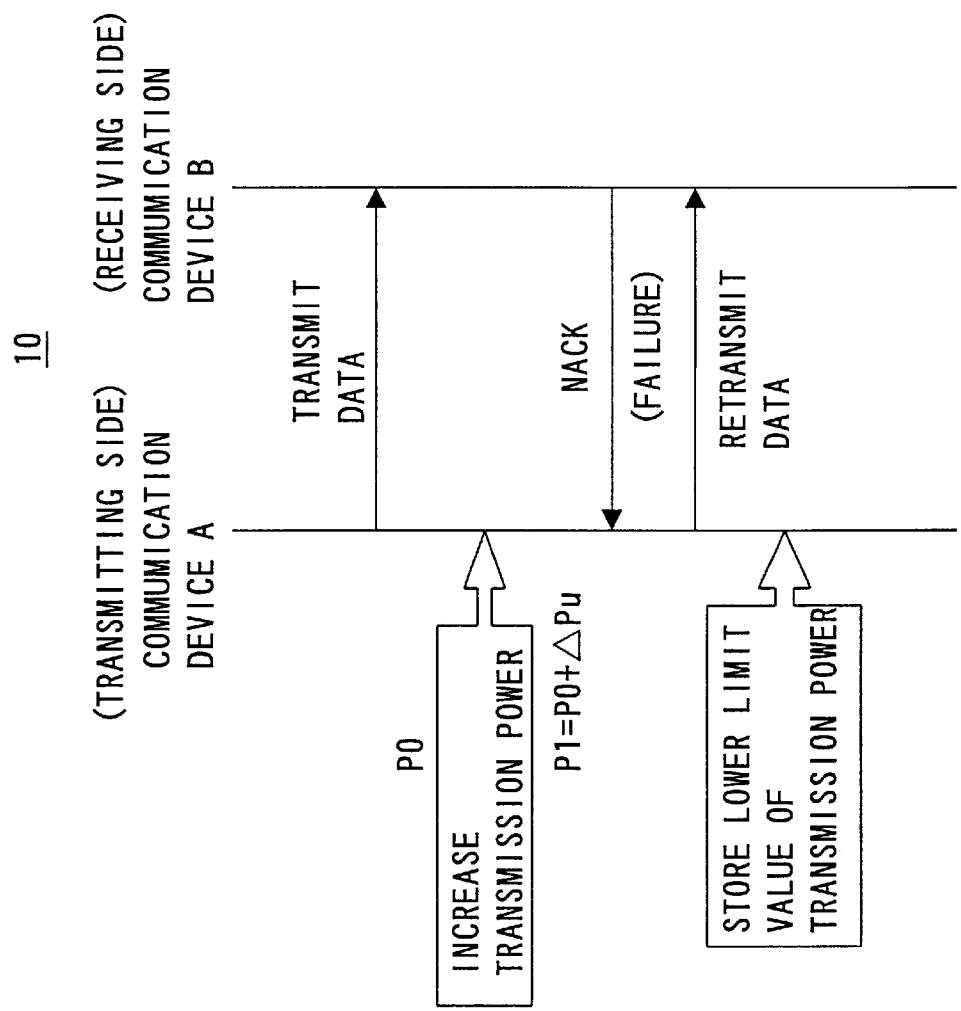
FIG. 2 is a second diagram for illustrating a communication sequence and transmission power level control in wireless communication system 10 according to an embodiment of the present invention.

FIG. 2 represents a sequence applied to control a level of transmission power when a data transmission fails.

As has been described with reference to FIG. 1, communication device A transmits data and immediately thereafter increases a level of transmission power P0 to a level of transmission power P1, which is equal to P0+ΔPu. If communication device B fails to normally receive data transmitted from communication device A, communication device B returns to communication device A signal NACK indicative of an unsuccessful reception of data.

When communication device A has received signal NACK, communication device A retransmits the data with the level of transmission power P1. Since the level of transmission power P0 has been previously increased to that of transmission power P1, it is not necessary to further increase transmission power. More specifically, data can be immediately retransmitted with a level of transmission power higher by ΔPu than when the data has been unsuccessfully transmitted. Consequently, a rapid response can be achieved to allow rapid communication.

Communication device A stores as a lower limit value of transmission power a level of transmission power being applied when a transmission failure has been detected, and communication device A thereafter controls transmission power to prevent any subsequent data transmission from being performed with transmission power lower in level than the lower limit value.

Figure 3:
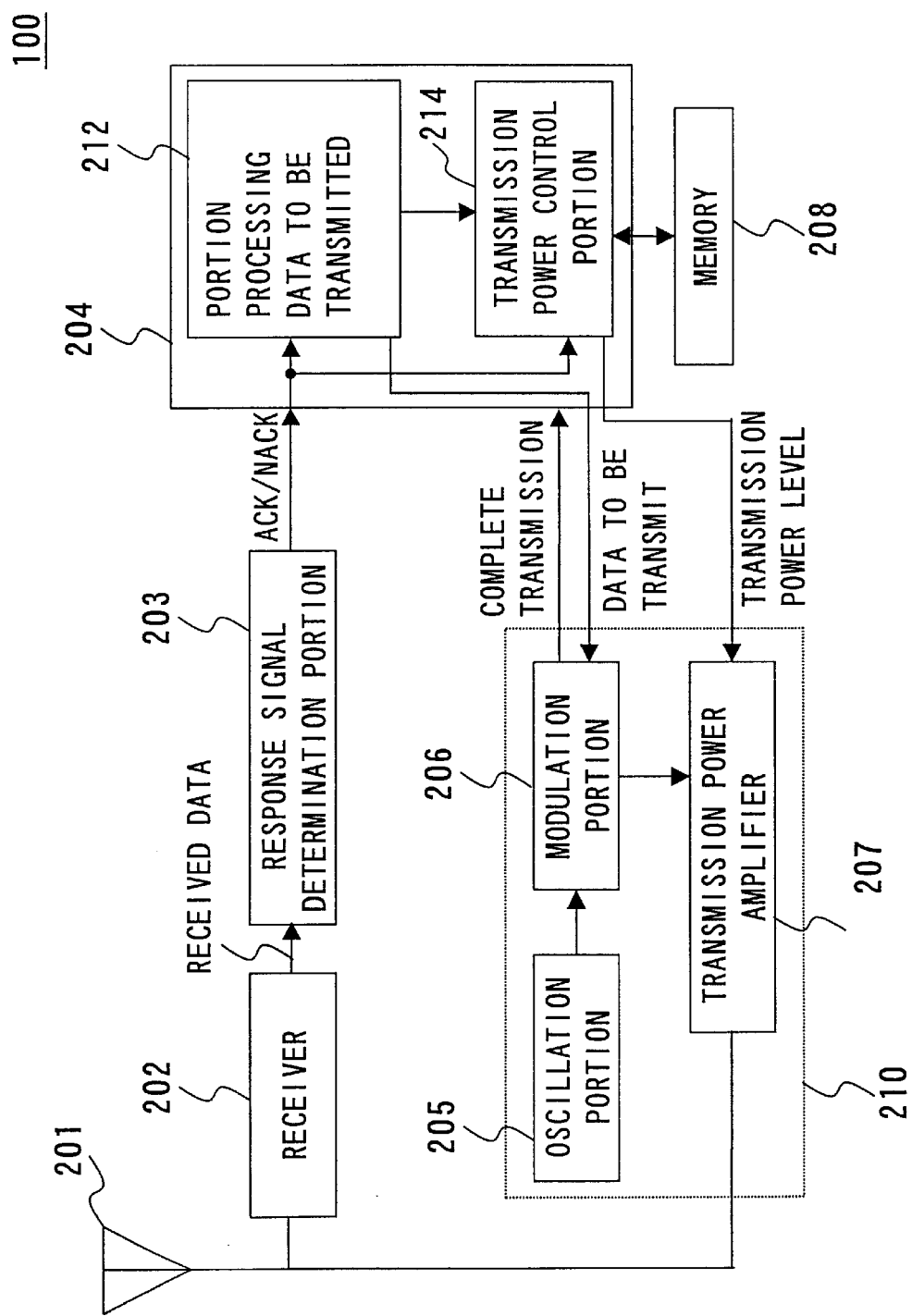
FIG. 3 is a block diagram showing a configuration of a wireless communication device 100 according to a first embodiment of the present invention.

Reference will now be made to FIG. 3 to describe a configuration of a wireless communication device in accordance with a first embodiment of the present invention.

As shown in FIG. 3, wireless communication device 100 corresponds to a transmitting wireless communication device A shown in FIGS. 1 and 2. Wireless communication device 100 includes an antenna 201 receiving various data and a response signal from another wireless communication device (communication device B, as shown in FIGS. 1 and 2), a receiver 202 modulating received data, and a response signal determination portion 203 determining whether a received response signal is signal ACK or signal NACK.

A response signal indicating a result of reception of transmitted data is returned from another wireless communication device, received by antenna 201 and demodulated at receiver 202. Response signal determination portion 203 determines whether a received response signal is signal ACK or signal NACK.

Wireless communication device 100 also includes a control unit 204 referring to a result of decision made by response signal determination portion 203, to process data to be transmitted and to control transmission power in level, a memory 208 storing a level of transmission power applied at a designated timing, and a transmitter 210 receiving data to be transmitted and a level of transmission power from control unit 204 and output the data via antenna 201.

Control unit 204 includes a portion processing data to be transmitted 212 responding to signals ACK and NACK to perform a processing to prepare data to be transmitted from wireless communication device 100, and a transmission power control portion 214 setting a level of transmission power in response to signal NACK/signal ACK and a trigger signal output from transmitter 210.

Note that the portion processing data to be transmitted 212 and transmission power control portion 214 are shown as independent blocks in control unit 204 only to explicitly shows that it can be configured to provide in parallel the processing provided by the portion processing data to be transmitted 212 to prepare data and the processing provided by transmission power control portion 214 to set a level of transmission power. As such, control unit 204 may for example be provided in the form of a single processor to execute in parallel a program corresponding to the processing provided by the portion processing data to be transmitted 212 and a program corresponding to the processing provided by transmission power control portion 214.

Furthermore, for example if rapidly processing data is not a strict requirement, the processing provided by the portion processing data to be transmitted 212 to prepare data and the processing provided by transmission power control portion 214 to set a level of transmission power may be provided in series. In this case, control unit 204 is not required to be highly capable of processing operations and control unit 204 may include a component such as a processor having its specification down-graded to expect cost reduction.

Transmitter 210 includes an oscillation portion 205 generating a transmission frequency for data to be transmitted that is output through antenna 201, a modulation portion 206 modulating data received from the portion processing data to be transmitted 212, and a transmission power amplifier 207 referring to a level of transmission power set by transmission power control portion 214, to amplify a signal received from modulation portion 206.

The portion processing data to be transmitted 212 outputs to modulation portion 206 data to be transmitted. Transmitter 210 amplifies the data to be transmitted to a level of transmission power designated by transmission power control portion 214 and thus sends the data externally via antenna 201.

Data is transmitted by wireless communication device 100 with a level of transmission power controlled in a manner described hereinafter.

Figure 4:
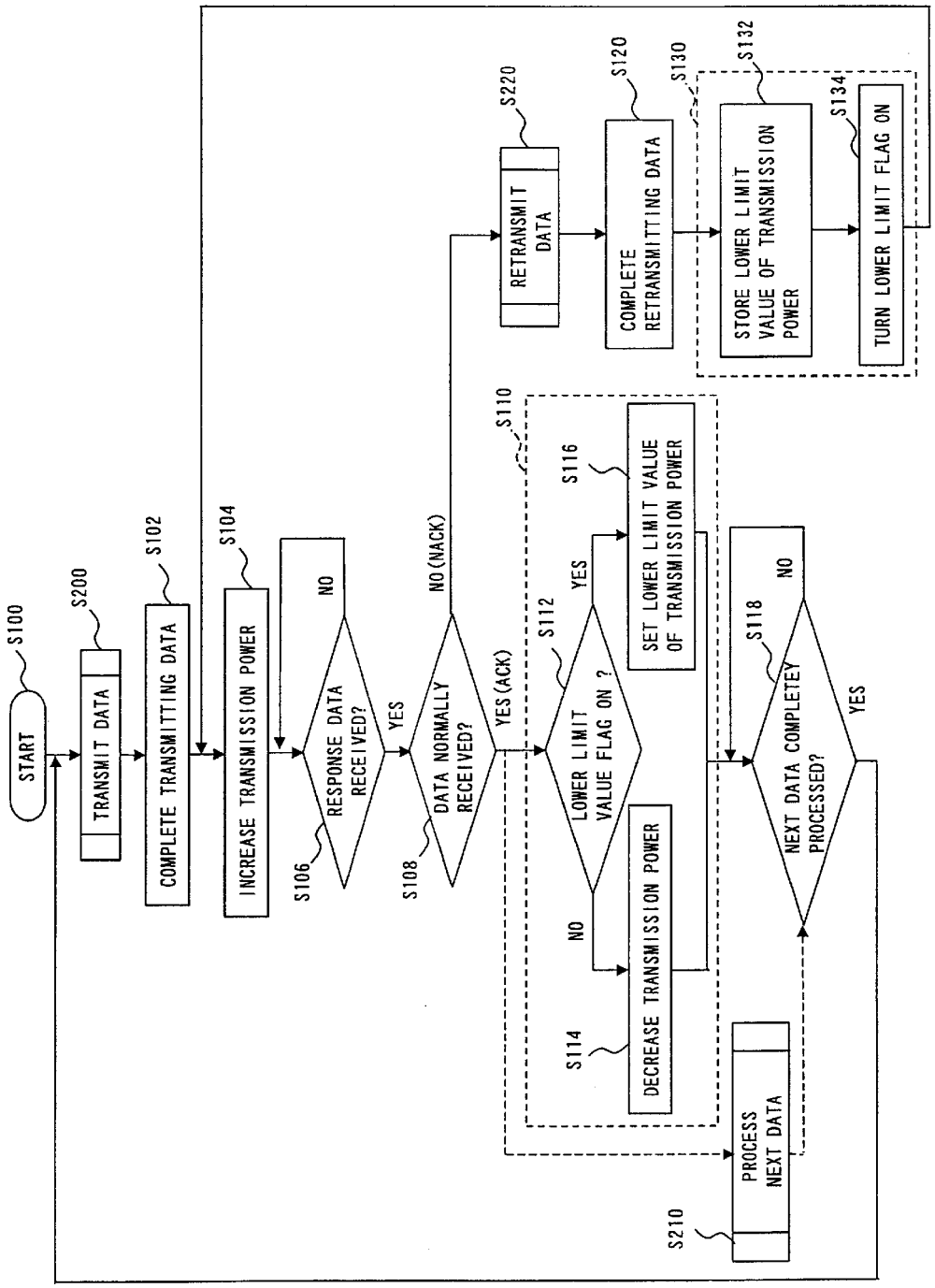
FIG. 4 is a flow chart of one example of a method of controlling transmission power in level that is performed by a control unit 204 shown in FIG. 3.

With reference to FIG. 4, when a data transmission starts (step (S)100), transmitter 210 transmits data received from the portion processing data to be transmitted 212 (S200). Transmission power control portion 214 receives a trigger signal for a complete transmission of data (S102) and immediately controls and thus increases transmission power (S104). Thus, transmission power is ΔPu greater in level than when data is transmitted at S200.

After transmission power control portion 214 increases transmission power, it waits for a responsive signal to be received and does not proceed with any further processing until it receives a response signal (S106).

When a response signal is received and response signal generation portion 203 outputs signal ACK or NACK (S108), a series of operations corresponding to the signal is performed.

If the data has been transmitted unsuccessfully or signal NACK has been received, the same data as transmitted at S200 is retransmitted (S220).

In this case, the same data is output from the portion processing data to be transmitted 212, passed via transmitter 210 and thus output via antenna 201. When the data has been completely retransmitted, a trigger signal is received from transmitter 210 (S210) and a group of steps S130 is executed to hold the current level of transmission power.

The group of steps S130 includes the step (S132) of storing in memory 208 a lower limit value of transmission power corresponding to a level of transmission power applied when data is retransmitted at S220, and the step (S134) of setting ON in level a signal of a lower limit flag stored in memory 208. The lower limit flag contains information on whether signal NACK has been previously received.

After the group of steps S130 is executed, step 104 is performed again increase transmission power to be prepared in advance for again retransmitting data in case of another data transmission failure. In this condition, wireless communication device 100 waits for a response signal to be received for the data transmission provided at S200 (S106).

Thus, for unsuccessful data transmission, the same data is retransmitted with transmission power incremented in level by ΔPu. Furthermore, transmission power has its lower limit value updated whenever signal NACK is received. As such, when increasing a level of transmission power changes a result of data transmission from unsuccessful to successful, the current level of transmission power is held as a lower limit value of transmission power corresponding to a minimal level of transmission power allowing data to be successfully transmitted.

If signal ACK is received at S108, it indicates that data has been successfully transmitted at S200 and subsequent data needs to be transmitted. Thus, transmission power control portion 214 provides a group of steps S110 to provide a processing to set a level of transmission power for a subsequent data transmission and in parallel with the group of steps S110 the portion processing data to be transmitted 212 processes data to be subsequently transmitted (S210).

The group of steps S110, setting a level of transmission power when data has been successfully transmitted, includes the step of determining whether the lower limit flag is ON or OFF (S112), the step of controlling a level of transmission power to drop it for the lower limit flag in the OFF state to decrease transmission power in level by a predetermined value of ΔPd (S114) and the step of setting as a level of power transmission for the lower limit flag in the ON state a lower limit value of transmission power stored in memory 208 (S116).

When the group of steps S110 sets a level of transmission power for a subsequent data transmission, control moves onto S118 waits until data to be subsequently transmitted is processed (S210) completely (S118).

When data to be subsequently transmitted has been completely processed, S200 is again executed to transmit the data.

Figure 5:
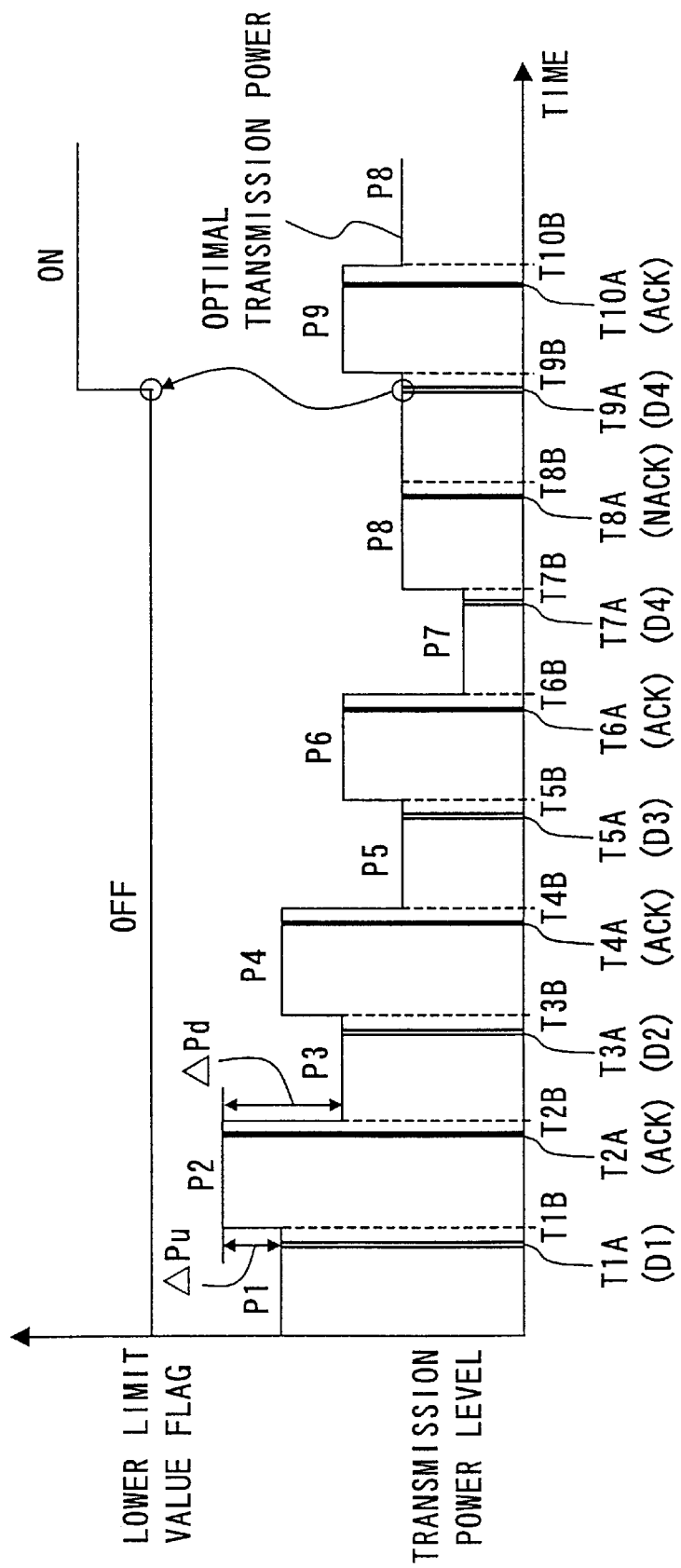
FIG. 5 shows one example of a transition in level of transmission power provided by the transmission power level control method according to the FIG. 4 flow chart.
Figure 6:
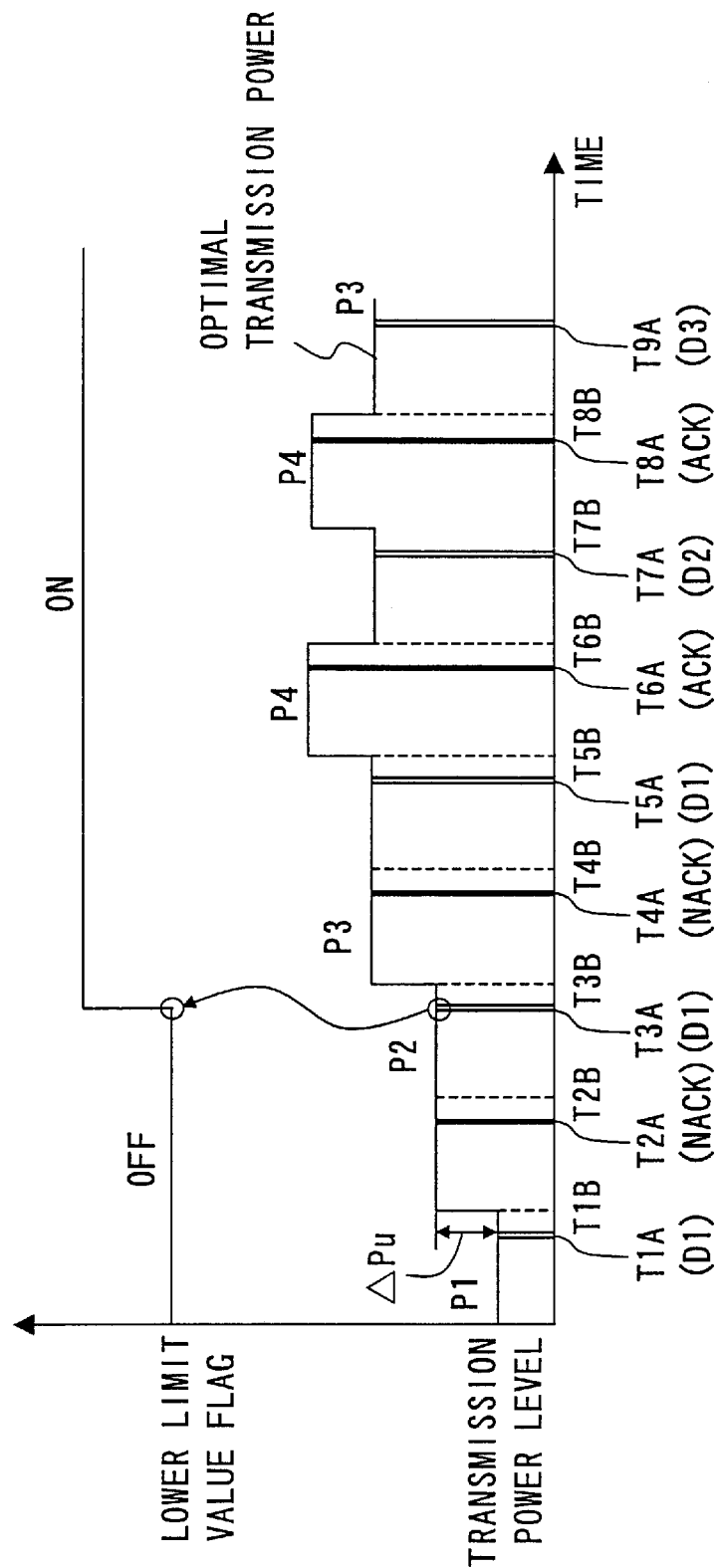
FIG. 6 shows another example of a transition in level of transmission power provided by the transmission power level control method according to the FIG. 4 flow chart.

Reference will now be made to FIGS. 5 and 6 to describe an example of a transition of transmission power in level provided by a method of controlling transmission power in level in accordance with the present invention.

FIG. 5 represents a transition in level of transmission power when data transmission is started with a level of transmission power higher than an optimal level of transmission power.

As shown in FIG. 5, at a time T1A data D1 is transmitted with a level of power P1 and at a time T1B the transmission power is controlled to be increased (S104) to increase the level of transmission power P1 by ΔPu to P2.

At a time T2A signal ACK is received indicating a result of transmitting data D1 at time T1A. At this time point, the lower limit flag is OFF and transmission power is thus controlled to be decreased (S114) and thus set to have a level of transmission power P3, which is equal to P2−ΔPd, wherein ΔPd>ΔPu.

At a time T3A the level of transmission power P3 is applied to transmit subsequent data D2 and at a time T3B transmission power is controlled to be increased (S104) to have a level of transmission power P4, which is equal to P3+ΔPu.

At a time T4A, signal ACK is received indicating that at time T3A data D2 has been successfully transmitted. At this time point the lower value flag is still OFF and transmission power is thus controlled to be decreased (S114) and at a time T4B transmission power drops in level to P5, which is equal to P4−ΔPd.

At a time T5A the level of transmission power P5 is applied to transmit subsequent data D3. At a time T5B, transmission power is controlled to be increased (S104) to have an increased level of P6, which is equal to P5+ΔPu.

At a time T6A, signal ACK is received indicating that at time T5A data D3 has been successfully transmitted. At this time point the lower limit flag is still OFF and transmission power is thus controlled to be decreased (S114) and at a time T6B transmission power drops in level to P7, which is equal to P6−ΔPd.

As is understood from a comparison between the levels of transmission power P3, P5 and P7 set in response to signal ACK at times T2B, T4B and T6B, respectively, setting ΔPd>ΔPu allows transmission power to be gradually decreased in level while signal ACK is received. This can save transmission power otherwise wastefully consumed.

At a time T7A the level of transmission power P7 is applied to transmit subsequent data D4. At a time T7B, transmission power is controlled to be increased (S104) to have an increased level of P8, which is equal to P7+ΔPu.

At a time T8A, signal NACK is received indicating that at time T7A data D4 has been unsuccessfully transmitted. Responsively, at a time T9A a level of transmission power P8 is applied to immediately retransmit data D4. Note that the level of transmission power P8 is provided by previously increasing the level of transmission power P7 by ΔPu. Furthermore S132 and S134 are performed to store the level of transmission power P8 as a lower limit value of transmission power and set the lower limit flag ON.

At a time T9B, transmission power is again controlled to be increased (S104). As a result, transmission power is increased in level to P9, which is equal to P8+ΔPu, and wireless communication device 100 is prepared for another transmission failure of data retransmitted.

At a time T10A, signal ACK is received indicating that at time T9A data D4 has been successively retransmitted. At this time point the lower value flag is ON. Responsively, at a time T10B, transmission power has its level set to have the lower limit value of transmission power (P8) corresponding to a level of transmission power stored in memory 208 that is applied at time T8B. Thereafter, the level of transmission power P8 is stored as a minimal level of transmission power allowing normal data transmission, i.e., an optimal level of transmission power.

FIG. 6 shows a transition in level of transmission power when data transmission is started with a level of power lower than an optimal level of transmission power.

As shown in FIG. 6, at time T1A, data D1 is transmitted with a level of transmission power P1. At time T1B, transmission power is controlled to be increased (S104) to increase the level of transmission power P1 by ΔPu to P2.

At time T2A, signal NACK is received indicating that at time T1A data D1 has been unsuccessfully transmitted. Responsively, at time T3A, a level of transmission power P2 is applied to retransmit data D1 immediately. The level of transmission power P2 is obtained by previously increasing the level of transmission power P1 by ΔPu. Furthermore, S132 and S134 are performed to store the level of transmission power P2 as a lower limit value of transmission power and set the lower limit flag ON.

At time T3B, transmission power is again controlled to be increased (S104) to have an increased level of P3, which is equal to P2+ΔPu, to be prepared for another transmission failure of data retransmitted.

At time T4A, signal NACK is received indicating that at time T3A data D1 has been unsuccessfully retransmitted. Responsively, at time T5A, a level of transmission power P3 is applied to again retransmit data D1 immediately. Note that the level of transmission power P3 is obtained by previously increasing that of transmission power P2 by ΔPu. Furthermore, S132 and S134 are performed to store the level of transmission power P3 as a lower limit value of transmission power. The lower limit flag is held ON.

At time T5B, transmission power is again controlled to be increased (S104) to have an increased level of P4, which is equal to P3+ΔPu, to be prepared for another transmission failure of data retransmitted.

At time T6A, signal ACK is received indicating that at time T5A data D1 has been transmitted. At this time point, the lower limit flag is ON and S116 is thus performed. As a result, at time T6B, transmission power is set to have the level of transmission power P3, which has been applied at time T5B, stored as a lower limit value of transmission power.

At time T7A, the level of transmission power P3 is applied to transmit subsequent data D2. At time T7B, transmission power is controlled to be increased (S104) to have an increased level of P4, which is equal to P3+ΔPu.

At time T8A, signal ACK is received indicating that at time T7A data D2 has been successfully transmitted. At this time point the lower value flag is still ON and S116 is thus performed. As a result, at time T8B, transmission power is set to have the level of transmission power P3 serving as the lower limit value of transmission power.

At time T9A, subsequent data D3 is transmitted. Thereafter, the level of transmission power P3 is held as a minimal level of transmission power allowing normal data transmission, i.e., an optimal level of transmission power.

Thus, transmission power can be controlled in level in response to signal ACK/signal NACK indicating that data has been transmitted successfully/unsuccessfully and a data transmission is immediately followed by the step S104 of controlling and thus increasing transmission power before the response signal is received. This can not only save transmission power otherwise wasted but also allow rapid communication.

Figure 7:
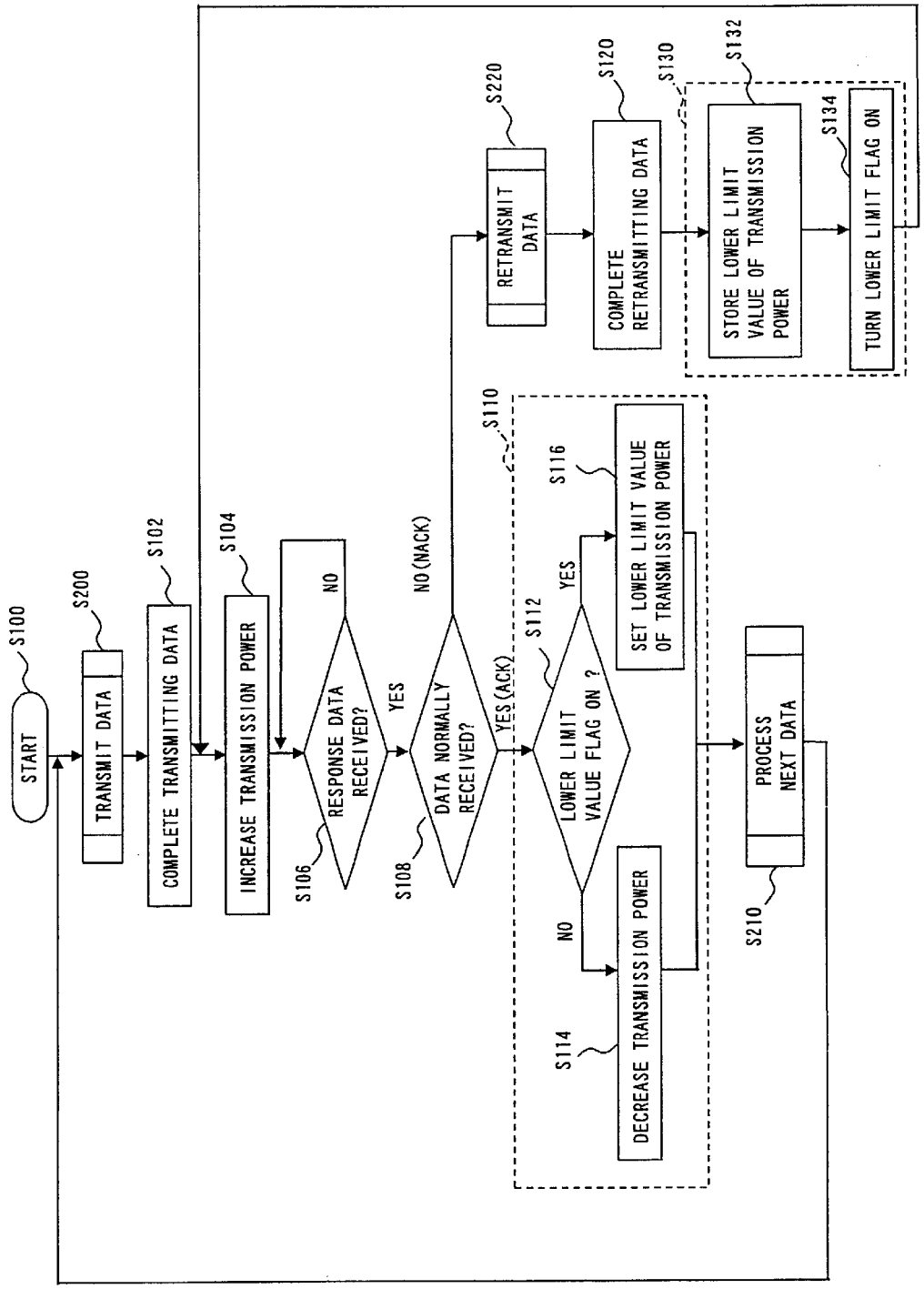
FIG. 7 is a flow chart of another example of the transmission power level control method performed by the FIG. 3 control unit 204.

FIG. 7 is a flow chart of another example of a method of controlling transmission power in level provided by control unit 240.

The transmission power control flow chart of FIG. 7 is distinguished from that of FIG. 4 in that the step S210 of providing a processing to prepare data to be subsequently transmitted and the group of steps S110 of setting a level of transmission power are provided in series. More specifically, the FIG. 7 flow chart is the FIG. 4 flow chart with S118 replaced by S210. The remainder of the FIG. 7 flow chart is similar to that of the FIG. 4 flow chart and will thus not be described.

Thus, the processing provided by the portion processing data to be transmittedly 212 to prepare data and the processing provided by transmission power control portion 214 to set a level of transmission power can also be performed in series.

Second Embodiment

The second embodiment is different from the first embodiment, providing a method of controlling a level of transmission power, as described hereinafter, to correspond to a case in which it is not necessary to retransmit data if signal NACK is received.

Figure 8:
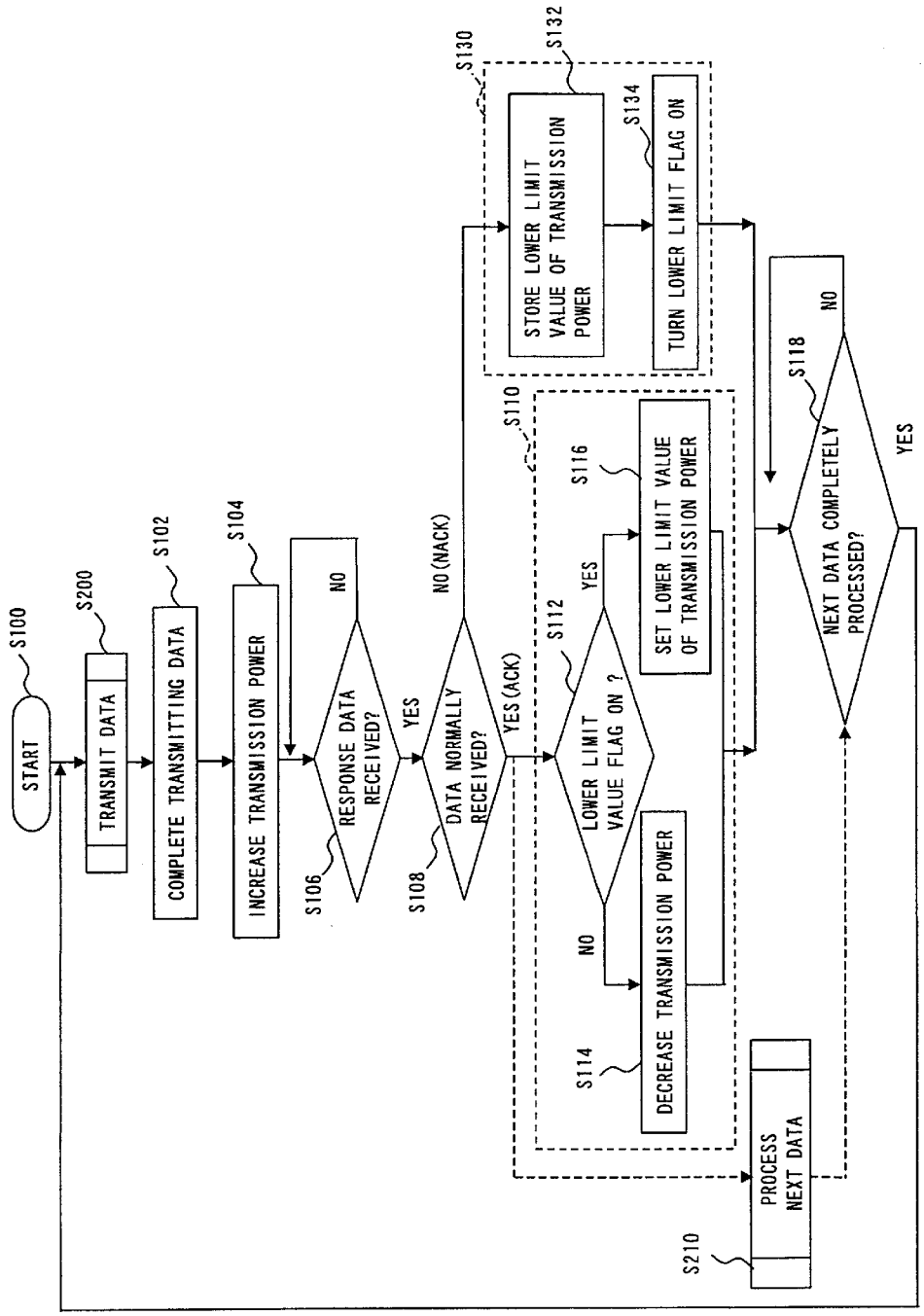
FIG. 8 is a flow chart of a transmission power level control method according to a second embodiment of the present invention.

With reference to FIG. 8, the second embodiment provides a transmission power level control method dispensing with retransmitting data. As such, as compared to the FIG. 4 flow chart, S108 with a reception of signal NACK detected is not followed by the step S220 of retransmitting data or the step S120 of detecting whether the data has been completely retransmitted.

Furthermore, the group of steps S130 of setting a level of transmission power is followed by the step S118 of waiting until subsequent data is completely processed, to transmit the subsequent data with the set level of transmission power. The other steps are as have been described with reference to FIG. 4 and will thus not be described.

Furthermore, as a variation of the second embodiment, the step S210 of providing a process to prepare data to be subsequently transmitted and the group of steps of setting a level of transmission power may be provided in series, as shown in FIG. 7. In this example, in the FIG. 8 flow chart S118 is replaced by S210.

With such a flow chart used to control a level of transmission power, if data has been unsuccessfully transmitted and retransmitting the data is not required there is not introduced a period of delay in control such as calculating an error rate. Thus, transmission power otherwise wastefully consumed can be saved and a condition for transmission can be rapidly improved.

Third Embodiment

In the methods as described in the first and second embodiments, once signal NACK is received a stored lower limit value of transmission power is referred to set a level of transmission power and thereafter the step of controlling and thus decreasing the level of transmission power (S114) is not performed.

The present embodiment provides a method allowing transmission power to be re-set in level to accommodate various conditions for transmission, such as communicating with a different, counterpart communication device adjacently, if signal NACK is once received.

Figure 9:
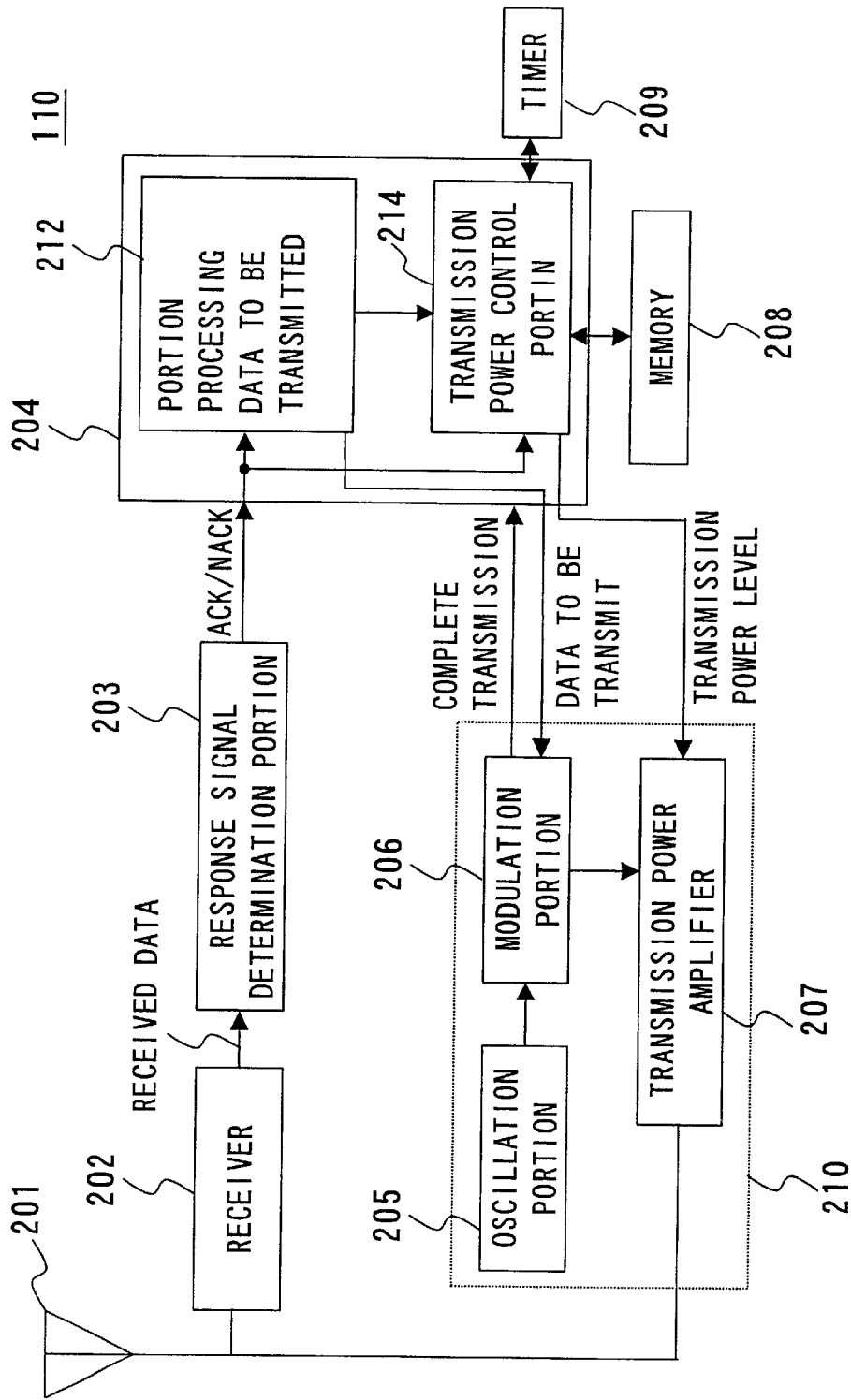
FIG. 9 is a block diagram showing a configuration of a wireless communication device 110 according to a third embodiment of the present invention.

With reference to FIG. 9, the present invention in a third embodiment provides a wireless communication device 110 distinguished from the FIG. 3 wireless communication device 100 in that the former wireless communication device further includes a timer 209 capable of communicating information with transmission power control portion 214. The remaining configuration and operation is similar to that of wireless communication device 100 and will thus not be described.

Timer 209 is provided to periodically initialize or clear a lower limit flag in memory 208 to return the flag to the OFF state, outputting a trigger signal to transmission power control portion 214 whenever a predetermined period of time elapses.

When transmission power control portion 214 is notified from timer 209 that the predetermined period of time has elapsed, transmission power control portion 214 clears the lower limit flag OFF.

Figure 10:
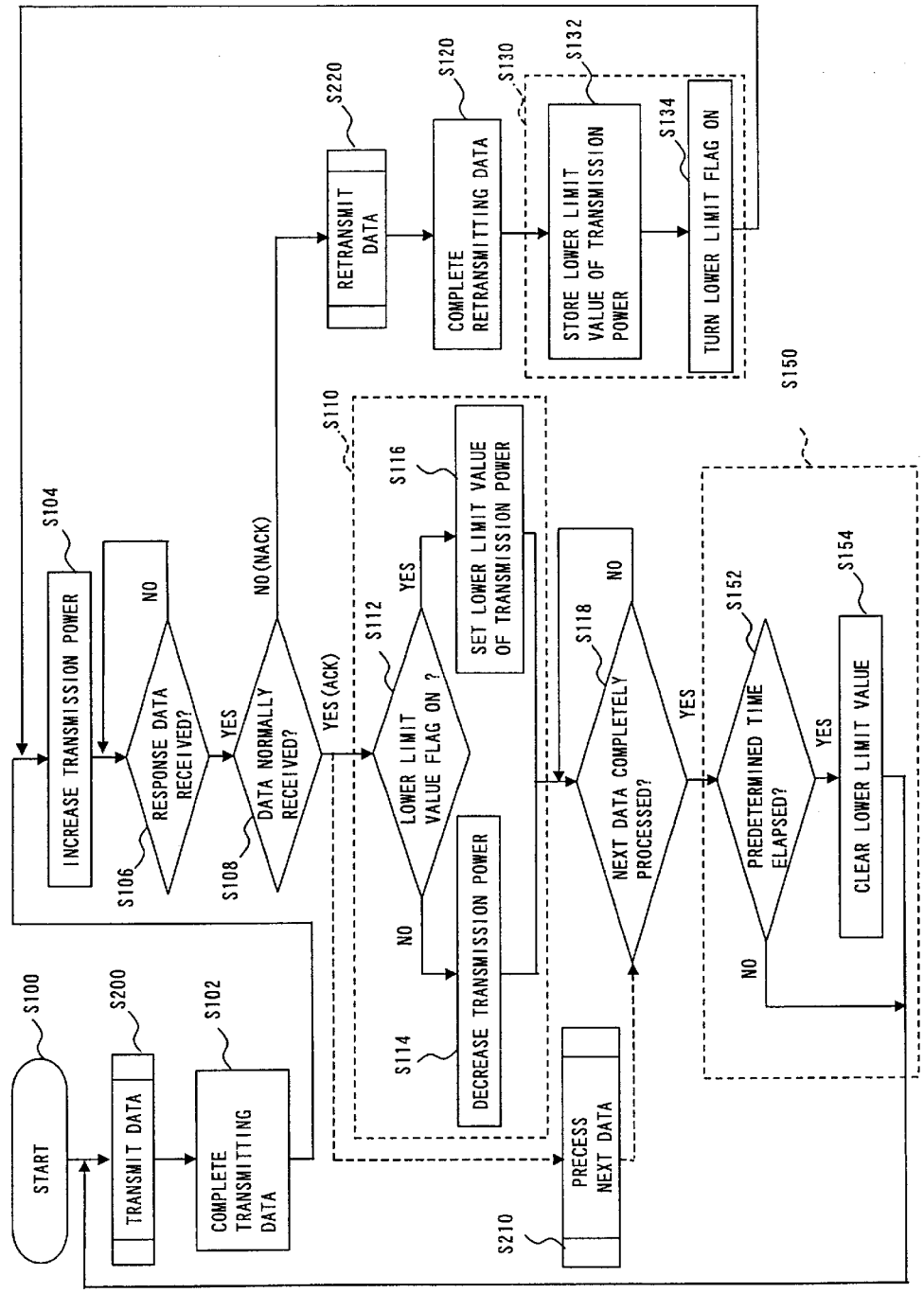
FIG. 10 is a flow chart of a transmission power level control method according to a third embodiment of the present invention.

With reference to FIG. 10, the transmission power level control flow chart of the third embodiment is different from that shown in FIG. 4 in that the former flow chart includes the step S150 of determining whether the predetermined period of time has elapsed and clearing the lower limit flag between the step S118 of determining whether subsequent data has been completely processed and the step S200 of in effect transmitting the data. The remaining steps are as have been described with reference to FIG. 4 and will thus not be described.

S150 includes a step S152 of determining whether the predetermined period of time has elapsed and a step S154 of initializing the lower limit flag when timer 209 detects that the predetermined period of time has elapsed. If the predetermined period of time has not yet elapsed, S154 is bypassed, resulting in the same process as the transmission power level control flow chart shown in FIG. 4.

Whenever a predetermined period of time elapses a lower limit flag can be initialized to re-set a lower limit value of transmission power so as to re-set an optimal value of transmission power in level to correspond to a variety of conditions for transmission.

Note that the second and third embodiments can be combined to re-set an optimal value of transmission power in level to correspond to a variety of conditions for transmission when signal NACK is received and retransmitting data is not required. This can be achieved simply by the transmission power level control flow chart of FIG. 8 with S118 followed by S150.

Furthermore, as a variation of the third embodiment, the step S210 of providing a processing to prepare data to be subsequently transmitted and the group of steps of setting a level of transmission power can also be provided in parallel. This corresponds to the FIG. 10 flow chart with S118 replaced by S210. This flow chart can also be applicable to the flow chart provided by combining the second and third embodiments.

Fourth Embodiment

Signal NACK is also issued for example for unsuccessful data receptions attributed to noise, an increased distance between moved wireless communication devices, and the like.

Signal NACK only notifies whether data has been received successfully or unsuccessfully and the signal cannot represent any cause thereof.

In the fourth embodiment, when signal NACK is once received and a lower limit flag is turned ON and then again signal NACK is received the lower limit flag is once cleared and transmission power is pulled up in level to a maximal value and thereafter a new optimal level of transmission power is set in a method as will now be described.

Figure 11:
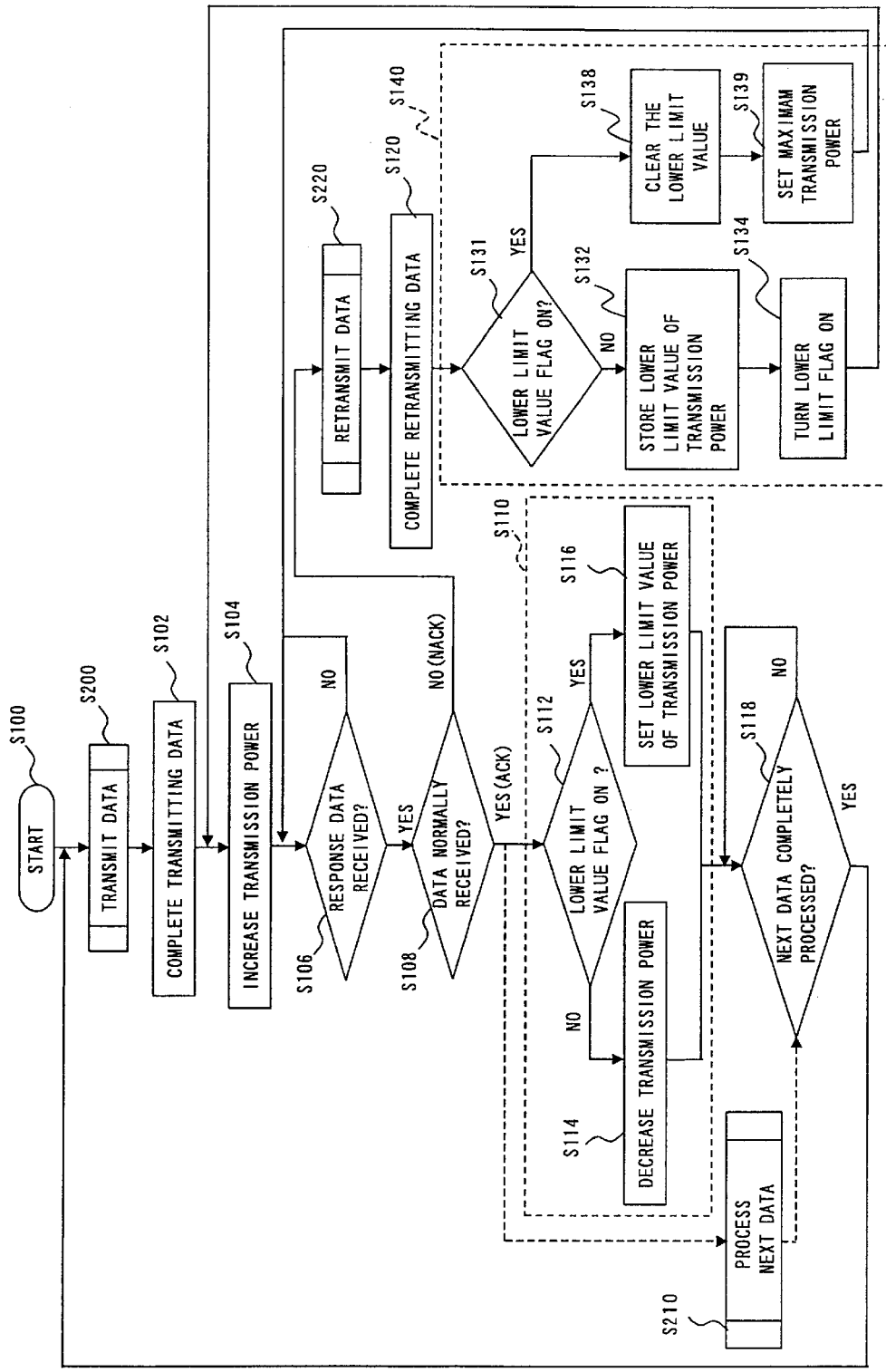
FIG. 11 is a flow chart of a transmission power level control method according to a fourth embodiment of the present invention.

With reference to FIG. 11, the transmission power level control flow chart in the fourth embodiment is distinguished from that as shown in FIG. 4 in that if signal NACK is received the step S120 of detecting whether data has been completely retransmitted is followed by a group of steps S140 rather than the group of steps S130.

As compared with the group of steps S130, the group of steps S140 further includes the step of determining whether the lower limit flag is currently turned ON (S131), the step of clearing the lower limit flag if the flag has already been turned ON (S138) and the step of setting a level of transmission power to have a maximal value (S139).

If in S131 the lower limit flag has the OFF state then as in FIG. 4 S132 and S134, also included in the group of steps 130, are performed.

Figure 12:
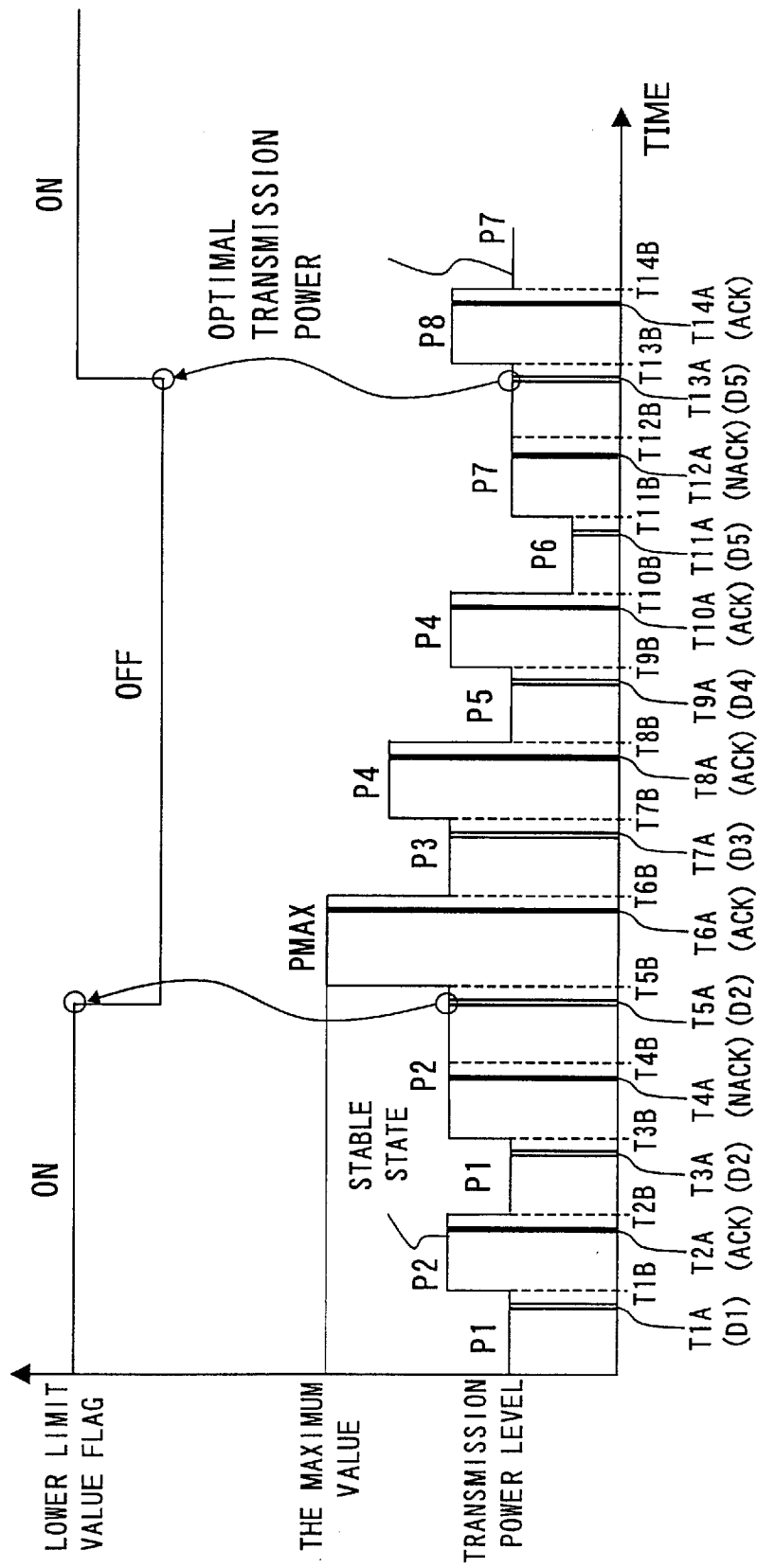
FIG. 12 is a diagram for illustrating a transition in level of transmission power provided by the transmission power level control method according to the fourth embodiment.

Reference will now be made to FIG. 12 to describe a transition of transmission power in level provided by the transmission power level control according to the fourth embodiment.

With reference to FIG. 12, at time T1A a level of transmission power P1 is applied to transmit data D1 and at time T2A signal ACK is received indicating that data D1 has been successfully transmitted. Thus at time T3A data D2 is transmitted with the same level of transmission power P1 as applied when data D1 is transmitted. This corresponds to the data transmission provided from the FIG. 5 time T8A onwards, corresponding to a stable state achieved when signal NACK is once received and the lower limit flag is thus turned ON.

At time T4A, signal NACK is received indicating that at time T3A data D2 has been unsuccessfully transmitted. The signal NACK received is not helpful in determining whether the unsuccessful transmission is attributed to noise or an increased distance between communication devices.

Accordingly, at time T5A, data D2 is retransmitted with a level of power P2, which is equal to P1+ΔPu, a previously increased level provided by controlling and thus increasing transmission power (S104). Furthermore, at time T5B the lower limit flag is initialized OFF (S138) and transmission power is increased in level to a maximal value PMAX (S139). PMAX is a maximum value in a controllable range of transmission power in the wireless communication device. Note that increasing a level of transmission power to a maximal value allows a subsequent data retransmission to be provided as reliably as possible. Note that increasing a level of transmission power up to a predetermined level or by a predetermined amount of step can also effectively increase the possibility that a subsequent data retransmission is provided successfully.

At time T6A, with transmission power increased in level to PMAX, signal ACK is received indicating that at time T5A data D2 has been successfully retransmitted. From time T6B onwards, while transmitting data in stable manner is prioritized the level of transmission power once pulled up to the maximal level is gradually reduced to an optimal, lower limit level.

At time T6B the current lower limit flag has the OFF state and transmission power is thus controlled to be decreased (S114) and at time T6B transmission power drops in level to P3, which is equal to PMAX minus ΔPd.

At time T7A, subsequent data D3 is transmitted with the level of transmission power P3. At time T7B, transmission power is controlled to be increased (S104) to be prepared for data retransmission in response to signal NACK being received. Thus, transmission power is increased in level to P4, which is equal to P3+ΔPu.

At time T8A, signal ACK is received indicating that at time T7A data D3 has been successfully transmitted. At time T8B, with the lower limit flag OFF, transmission power is controlled to be decreased (S114) to have a decreased level of P5, which is equal to P4 minus ΔPd.

At time T9A, subsequent data D4 is transmitted with the level of transmission power P5. Thus, data is transmitted with a level of transmission power dropping by ΔPd minus ΔPu whenever signal ACK is received.

At time T12A, signal NACK is received indicating that at time T11A data D5 has been transmitted unsuccessfully. Responsively, at time T13A, a level of transmission power P7 is applied to retransmit data D5 immediately. The level of transmission power P7 is obtained by previously increasing the level of transmission power P6 by ΔPu. Furthermore, S132 and S134 are performed to store the level of transmission power P7 as a lower limit value of transmission power and turn the lower limit flag ON.

At time T13B, transmission power is controlled to be increased (S104) to be prepared for unsuccessful retransmission of data D5. Thus, transmission power is increased in level to P8, which is equal to P7+ΔPu.

At time T14A, signal ACK is received indicating that at time T13A data D5 has been successfully retransmitted. This means that the level of transmission power P7 is an optimal level of transmission power, i.e., a minimal level of transmission power required for maintaining satisfactory data transmission. As such, this value is continuously used, applied as a stable state, to set a level of transmission power.

Thus, when another one of signal NACK is received a lower limit value of transmission power is once initialized and after transmission power is increased to a maximal level an optimal level of transmission power is re-set. As such, even if noise occurs or a communication distance is temporarily increased to result in unsuccessful transmission, a level of transmission power in stable state can be set to constantly have a high level to save transmission power otherwise wastefully consumed.

Furthermore, once increasing a level of transmission power and then setting an optimal lower limit level can reduce power consumption while prioritizing that successful data reception be maintained.

Furthermore, in the FIG. 11 flow chart at step S139 once decreasing a level of transmission power rather than increasing it to a maximal value can re-set an optimal level of transmission power corresponding to a variety of conditions. This can be achieved by once decreasing a level of transmission power and then gradually increasing it, and setting as an optimal level of transmission power a level of transmission power having provided a data reception again successfully (or when signal ACK is received).

As such, if rapidly communicating data is not a strict requirement, such a configuration as described above can be applied to control a level of transmission power while reducing transmission power is prioritized.

In such a case as above, as well as FIG. 7, the step S210 of performing a processing to prepare data to be subsequently transmitted and the group of steps of setting a level of transmission power can also be provided in series. This corresponds to the FIG. 11 flow chart with S118 replaced by S210.

Furthermore the third and fourth embodiments can be combined to clear a lower limit flag when a timer detects that a predetermined period of time has elapsed as well as to set transmission power to have a predetermined level.

The present method of controlling transmission power of a wireless communication device is applicable to a wireless communication device for example employing an infrared ray to transmit data. In this example a level of transmission power corresponds to a level in intensity of emission of an infrared ray output from the wireless communication device. As such a set level of transmission power can be simply referred to to selectively turn on/off an infrared LED emitting an infrared ray and control an amount of current.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wireless communication device comprising:
   a control portion for setting data to be transmitted subjected to data transmission, and a level of transmission power for said data transmission;
   a transmitter for performing said data transmission with the level of transmission power set by said control portion; and
   a response signal determination portion for determining from an externally received signal whether said data transmission provides a successful transmission result or an unsuccessful transmission result,
   wherein said control portion
   i) after said data transmission has completed and before said transmission result is determined, increases a level of transmission power for a current data transmission by a first predetermined level to a first level of power to set a level of transmission power for a subsequent data transmission, and
   ii) if said response signal determination portion determines that said data transmission provides said successful transmission result, sets the level of transmission power for said subsequent data transmission to have a second level of power corresponding to said first level of power minus a second predetermined level, and wherein said second predetermined level is greater than said first predetermined level.

2. A wireless communication device comprising:
   a control portion for setting data to be transmitted subjected to data transmission, and a level of transmission power for said data transmission;
   a transmitter for performing said data transmission with the level of transmission power set by said control portion; and
   a response signal determination portion for determining from an externally received signal whether said data transmission provides a successful transmission result or an unsuccessful transmission result,
   wherein said control portion
   i) after said data transmission has completed and before said transmission result is determined, increases a level of transmission power for a current data transmission by a first predetermined level to a first level of power to set a level of transmission power for a subsequent data transmission, and
   ii) if said response signal determination portion determines that said data transmission provides said successful transmission result, sets the level of transmission power for said subsequent data transmission to have a second level of power corresponding to said first level of power minus a second predetermined level;
   wherein if said response signal determination portion determines that said data transmission provides an unsuccessful transmission result then said control portion subjects data to be transmitted identical to that with said unsuccessful transmission result to said subsequent data transmission and said transmitter in said subsequent data transmission uses said first level of power to retransmit data to be transmitted identical to that with said unsuccessful transmission result; and,
   further comprising a memory for storing as a lower limit level of transmission power the level of transmission power of said retransmission when said data transmission is determined to provide said unsuccessful transmission result, wherein if said data transmission is determined to provide said successful transmission result said control portion refers to whether said memory stores said lower limit level of transmission power, to set the level of transmission power for said subsequent data transmission to be either one of said lower limit level of transmission power or said second level of power.

3. The wireless communication device of claim 2, further comprising a timer detecting whether a predetermined period has elapsed, wherein whenever said timer detects that said predetermined period has elapsed said control portion clears said lower limit level of transmission power held in said memory.

4. The wireless communication device of claim 2, wherein if said data transmission is determined to provide said unsuccessful transmission result and said lower limit level of transmission power has already been held then said control portion initializes said lower limit level of transmission power and increases the level of transmission power for said subsequent data transmission up to a predetermined level of power.

5. The wireless communication device of claim 4, wherein said predetermined level of power is a maximal value in a controllable range of the level of transmission power in said wireless communication device.

6. A method of controlling transmission power of a wireless communication device capable of controlling a level of transmission power, comprising the steps of:
   performing data transmission with the level of transmission power;
   after said data transmission has completed, increasing the level of transmission power in said data transmission by a first predetermined level to provide a level of transmission power for a subsequent data transmission;

determining from an externally received signal whether said data transmission provides a successful transmission result or an unsuccessful transmission result; and if said data transmission provides said successful transmission result, decreasing by a second predetermined level the level of transmission power for said subsequent data transmission corresponding to the level of transmission power increased by said first predetermined level, and wherein said second predetermined level is greater than said first predetermined level.

7. A method of controlling transmission power of a wireless communication device capable of controlling a level of transmission power, comprising the steps of:

performing data transmission with the level of transmission power;

after said data transmission has completed, increasing the level of transmission power in said data transmission by a first predetermined level to provide a level of transmission power for a subsequent data transmission;

determining from an externally received signal whether said data transmission provides a successful transmission result or an unsuccessful transmission result; and if said data transmission provides said successful transmission result, decreasing by a second predetermined level the level of transmission power for said subsequent data transmission corresponding to the level of transmission power increased by said first predetermined level, further comprising the step of retransmitting data identical to that transmitted in said data transmission determined to provide said unsuccessful transmission result, with the level of transmission power increased by said first predetermined level, and if said data transmission is determined to provide said unsuccessful transmission result, holding as a lower limit level of transmission power a level of transmission power being applied when said unsuccessful transmission result is detected; and if said data transmission is determined to provide said successful transmission result and said lower limit level of transmission power has already been held, setting the level of transmission power for said subsequent data transmission to be said lower limit level of transmission power, rather than the step of decreasing.

8. The method of claim 7, further comprising the steps of:

determining whether a predetermined period has elapsed; and whenever said predetermined period elapses, initializing said lower limit level of transmission power held.

9. The method of claim 7, further comprising the step of initializing said lower limit level of transmission power, if any held, and increasing the level of transmission power for said subsequent data transmission up to a predetermined level of power, if said data transmission is determined to provide said unsuccessful transmission result.

10. The method of claim wherein said predetermined level of power is a maximal value in a controllable range of the level of transmission power in said wireless communication device.

11. A wireless communication system comprising:

a receiving, first wireless communication device returning a response signal indicative of a result of receiving transmitted data;

a transmitting, second wireless communication device capable of controlling a level of transmission power in data transmission, said second wireless communication device including a control portion for setting data to be transmitted subjected to said data transmission and a level of transmission power for said data transmission, a transmitter for performing said data transmission with the level of transmission power set by said control portion, and a response signal determination portion determining from said response signal whether said data transmission provides a successful transmission result or an unsuccessful transmission result, said control portion;

i) after said data transmission completes and before said transmission result is determined, increasing a level of transmission power for a current data transmission by a first predetermined level to a first level of power to provide a level of transmission power for a subsequent data transmission, and ii) if said response signal determination portion determines that said data transmission provides said successful transmission result, setting the level of transmission power for the subsequent data transmission to be a second level of power corresponding to said first level of power minus a second predetermined level, and wherein said second predetermined level is greater than said first predetermined level.

12. A wireless communication device comprising:

a control portion for setting data to be transmitted subjected to data transmission, and a level of transmission power for said data transmission;

a transmitter for performing said data transmission with the level of transmission power set by said control portion; and a response signal determination portion for determining from an externally received signal whether said data transmission provides a successful transmission result or an unsuccessful transmission result, wherein said control portion i) before said transmission result is determined, immediately increases a level of transmission power for a current data transmission by a first predetermined level to a first level of power to set a level of transmission power for a subsequent data transmission in response to completion of said data transmission by said transmitter, and ii) if said response signal determination portion determines that said data transmission provides said successful transmission result, sets the level of transmission power for said subsequent data transmission to have a second level of power corresponding to said first level of power minus a second predetermined level.

13. The wireless communication device of claim 12, wherein if said response signal determination portion determines that said data transmission provides an unsuccessful transmission result, then said control portion subjects data to be transmitted identical to that with said unsuccessful transmission result to said subsequent data transmission and said transmitter in said subsequent data transmission uses said first level of power to retransmit data to be transmitted identical to that with said unsuccessful transmission result.

14. The wireless communication device of claim 12, wherein said second predetermined level is greater than said first predetermined level; and if said response signal determination portion determines that said data transmission provides said successful transmission result, then said control portion provides, in parallel, setting data to be transmitted subjected to said subsequent data transmission and setting the level of transmission power for said subsequent data transmission to be said second level of power.

15. A wireless communication device of claim 12, wherein said second predetermined level is greater than said first predetermined level; and if said response signal determination portion determines that said data transmission provides said successful transmission result, then said control portion provides, in series, setting data to be transmitted subjected to said subsequent data transmission and setting the level of transmission power for said subsequent data transmission to be said second level of power.

16. A method of controlling transmission power of a wireless communication device capable of controlling a level of transmission power, comprising the steps of:

performing data transmission with the level of transmission power;

immediately increasing the level of transmission power in said data transmission by a first predetermined level to provide a level of transmission power for a subsequent data transmission in response to completion of said data transmission by said transmitter;

determining from an externally received signal whether said data transmission provides a successful transmission result or an unsuccessful transmission result; and if said data transmission provides said successful transmission result, decreasing by a second predetermined level the level of transmission power for said subsequent data transmission corresponding to the level of transmission power increased by said first predetermined level.

17. The method of claim 16, further comprising the step of retransmitting data identical to that transmitted in said data transmission determined to provide said unsuccessful transmission result, with the level of transmission power increased by said first predetermined level.

18. The method of claim 16, wherein said second predetermined level is greater than said first predetermined level, and further comprising the step of processing data subjected to said subsequent data transmission, if said data transmission is determined to provide said successful transmission result, the step of processing being provided in parallel with the step of decreasing.

19. The method of claim 16, wherein said second predetermined level is greater than said first predetermined level, and further comprising the step of processing data subjected to said subsequent data transmission, if said data transmission is determined to provide said successful transmission result, the step of processing being provided in series with the step of decreasing.

20. A wireless communication system comprising:

a receiving, first wireless communication device returning a response signal indicative of a result of receiving transmitted data;

a transmitting, second wireless communication device capable of controlling a level of transmission power in data transmission, said second wireless communication device including a control portion for setting data to be transmitted subjected to said data transmission and a level of transmission power for said data transmission, a transmitter for performing said data transmission with the level of transmission power set by said control portion, and a response signal determination portion determining from said response signal whether said data transmission provides a successful transmission result or an unsuccessful transmission result, said control portion;

i) before said transmission result is determined, immediately increasing a level of transmission power for a current data transmission by a first predetermined level to a first level of power to provide a level of transmission power for a subsequent data transmission in response to completion of said data transmission by said transmitter, and, ii) if said response signal determination portion determines that said data transmission provides said successful transmission result, setting the level of transmission power for the subsequent data transmission to be a second level of power corresponding to said first level of power minus a second predetermined level.

21. The wireless communication system of claim 20, wherein, if said response signal determination portion determines that said data transmission provides said unsuccessful transmission result, then said control portion subjects data to be transmitted identical to that with said unsuccessful transmission result to said subsequent data transmission and said transmitter in said subsequent data transmission uses said first level of power to retransmit data to be transmitted identical to that with said unsuccessful transmission result.

* * * * *